United States Patent [19]

Belz et al.

[11] 4,435,816
[45] Mar. 6, 1984

[54] METHOD AND ARTICLE FOR PROTECTING TAPERED THREADED ELECTRODE JOINTS BY USE OF AN ALIGNMENT MECHANISM

[75] Inventors: Herman M. Belz; Harry C. Stieber, both of Berea, Ohio

[73] Assignee: Union Carbide Corporation, Danbury, Conn.

[21] Appl. No.: 393,989

[22] Filed: Jun. 30, 1982

[51] Int. Cl.³ .............................................. H05B 7/14
[52] U.S. Cl. ...................................................... 373/91
[58] Field of Search ............................. 373/91, 92, 93

[56] References Cited

U.S. PATENT DOCUMENTS

| | | | |
|---|---|---|---|
| 3,495,123 | 2/1970 | Raddatz | 373/92 X |
| 3,771,888 | 11/1973 | Gazda | 373/92 X |
| 3,795,753 | 3/1974 | Mori et al. | |
| 3,796,818 | 3/1974 | Yuasa et al. | |
| 4,002,942 | 1/1977 | Gaboury | 373/92 X |

FOREIGN PATENT DOCUMENTS 1076845  3/1960  Fed. Rep. of Germany .

*Primary Examiner*—Roy Envall
*Attorney, Agent, or Firm*—Robert C. Cummings

[57] ABSTRACT

Taper thread joints in carbon or graphite electrode columns are protected from thread damage during assembly by use of a consumable centering pin to assure axial alignment of the mating parts, thereby preventing thread damage and resulting thread debris from forming and interfering with the proper fit of the mating parts forming the joint.

13 Claims, 2 Drawing Figures

4,435,816

METHOD AND ARTICLE FOR PROTECTING TAPERED THREADED ELECTRODE JOINTS BY USE OF AN ALIGNMENT MECHANISM

FIELD OF THE INVENTION

The invention relates to an improved method using an article in a unique manner for forming carbon and/or graphite electrode columns which are formed by joining together individual electrode sections either directly or with the use of an intermediate connecting pin all in a tapered threaded manner.

STATEMENT OF THE PRIOR ART

A method that has heretofore been proposed to solve the problem to which the subject invention is directed involves the use of match marks on the electrode sections which are to be threaded together. In the practice of this method, while if done properly, excellent results are achieved, the threaded sections must be coaxial as they approach one another to be joined. This is accomplished by visual manual alignment which is difficult and if not done with precision, tends to be unreliable and accordingly, mechanical clamps or sleeves must be installed and subsequently removed at the point of assembly (the furnace) to assure the necessary coaxial alignment.

Other prior art solutions in this general subject area are disclosed in U.S. Pat. Nos. 3,795,753 (see FIG. 1 particularly) and 3,796,818 (see FIG. 2 particularly) and are thus illustrative of the various proposed solutions. In each of these patents, cumbersome and expensive machinery is disclosed for use in the attempt to guide one electrode section as it approaches the other. In addition, while the invention disclosed in a German Pat. No. 1,076,845 has the purpose of aligning the electrode column members, it attempts to accomplish this while the electrode column members are being tightened and does not address the problems of thread alignment required to avoid damage as one section of the electrode column approaches another.

While such methods and devices are usually acceptable for their intended purposes, they have not proved to be entirely satisfactory in that they are either complex or inconvenient to use or to operate. As a result of the shortcomings of the prior art, typified by the above, there has developed and continues to exist a substantial need for methods and devices of the character described. Despite this need, and the efforts of many individuals and companies to develop such methods and devices, a totally satisfactory method and device for meeting this need has heretofore been unavailable.

The principal object of this invention is to provide a method and device for the purpose described, which combines simplicity and ease of operation to a high degree together with inexpensiveness in the carrying out of the same.

Other objects of this invention will in part be obvious and in part be hereinafter pointed out.

SUMMARY OF THE INVENTION

This invention resides in the providing of an axially located pin extending from one electrode column member having tapered threads that engages a recess or hole in the mating element of another electrode column member also having tapered threads before the two members forming the mating joint are in such a relative relationship that their respective threads are in a position to make contact.

BRIEF DESCRIPTION OF THE DRAWING

In the accompanying drawing, in which is shown alternative illustrative embodiments of this invention, and wherein like reference characters identify the same or like parts.

BACKGROUND OF THE INVENTION

Figure 1:
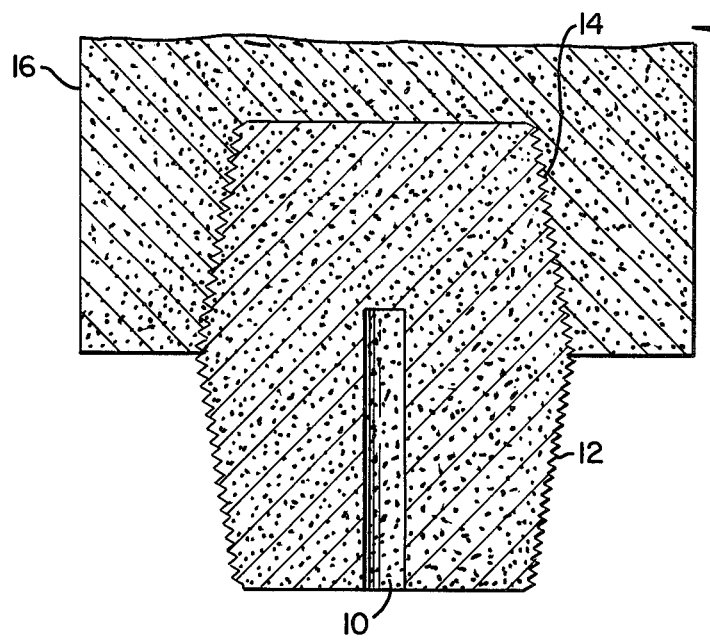
FIG. 1 is an exploded side view section of a partial electrode column showing two electrode sections and a connecting pin with one of said electrode sections being provided with a consumable centering pin.
Figure 1:
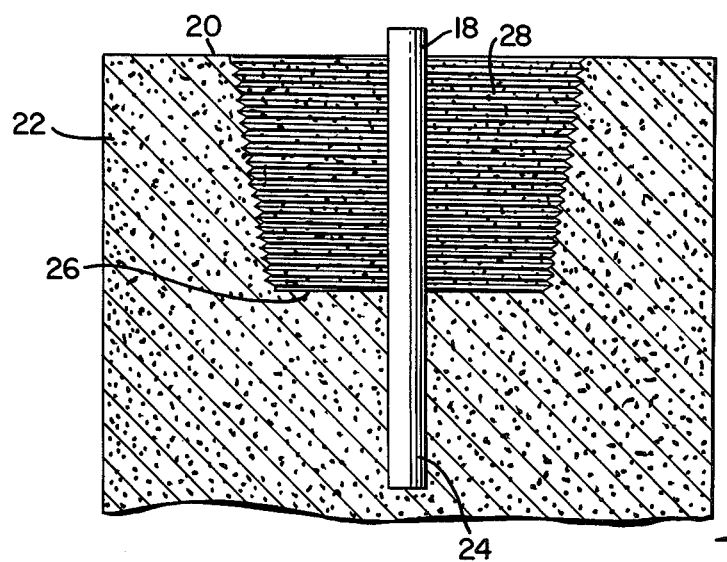

As the result of the normal operation of an electric arc furnace, the carbon or graphite electrode employed as the heat source are consumed. In order to maintain continuous, or in the least, operation of the furnace with the least amount of shutdown, it is necessary to be able to continuously join a new electrode to an electrode that is already mounted and/or in operation in the furnace. Conventionally, this is done by threading one electrode into another directly or by use of an intermediate double end threaded socket or pin. Two or more joined electrodes, either joined directly or joined with the use of connecting pin(s), is referred to as an electrode column; the individual electrodes are referred to as electrode sections.

A problem that is common to carbon and graphite electrode sections is thread damage upon joint assembly. The debris from damaged threads presents a problem that is more serious, perhaps, than the damaged thread itself. If the debris remains on the load-bearing surface of the threads, it creates a region of high stress, some thread gap, and high localized current density that creates a "hot spot" and potential joint failure.

The threaded joint of an electrode section itself and the connecting pin may alternatively have straight or tapered threads. It will be appreciated by those skilled in the art that one electrode section may be joined directly to another electrode section by providing alternating electrode sections with a complementary male nipple and female recess, or two electrode sections may be joined by the use of a connecting pin having, in effect, two nipple ends or two female recesses, or any of each, as the case may be, to properly mate with the adjacent electrode section.

When tapered threads on or in the electrode sections and the connecting pin are employed, one member must penetrate the mating member before the threads can be engaged and it is to this type of thread engagement to which the subject invention is directed. As generally indicated above, one version of a taper thread electrode joint connection involves a direct male-female relationship between a nipple on the electrode section being added to the electrode column and a complementary female recess on the electrode section already in place in the furnace, or vice versa; and the other version involves the use of an intermediate connecting pin having one nipple and one female recess or two of the same at opposite ends which would be used to join with a complementary female recess or nipple in or one the electrode section, as the case may be. If a connecting pin is employed, it may be initially coupled with the electrode section or column already installed in the furnace or it may be initially coupled with the electrode section that is to be joined with the first electrode section or column.

Some means, usually a crane, is used to carry the electrode section to be added to the furnace electrode section. The male threaded section associated with one electrode section must penetrate the female threaded recess of the other electrode section before the tapered threads can mesh. This being the case, the socket wall obscures the operator's view and deprives him of a satisfactory visual sighting means for positioning the electrode section to be added. At this point, vertical motion may cause the thread(s) on one electrode section (or any in-place connecting pin) to graze the thread(s) on the other. As will be appreciated, pendulum motion of the electrode section to be added to the electrode column and which is suspended from the crane may permit lateral impact of the two sets of threads.

Both carbon and graphite are brittle materials and a contact, either grazing or lateral, frequently produces debris such as chips.

The threads are very close and form a labyrinth which impedes the escape of the chips. The trapped chips interfere with the proper fit of the threads and reduce or completely eliminate end face pressure, thereby reducing or eliminating the desired electrical conductivity through the end faces of the electrode sections. Further, the chips trapped between the load-bearing surfaces of the threads destroy the intended current path and limit it to the path through the entrapped debris. High current density at the points of trapped debris causes very high localized temperatures creating thermal stresses that may be sufficient to cause structural failure, and hence, joint failure. Instances of trapped debris are often found in assembled carbon or graphite electrode columns formed by a method other than that of the subject invention.

It should also be appreciated that a similar problem exists when a lifting device such as a crane fitted with a lift cap or lift plug having tapered threads is connected to the threads at one end of an electrode section to transport it to the furnace electrode or its associated connecting pin.

DETAILED DESCRIPTION OF THE INVENTION

In the subject invention, thread damage of the aforesaid type is alleviated or altogether eliminated by the use of an axially located centering pin extending from one taper threaded section of an electrode column that engages a complementary recess in the mating section of the electrode column before the two sections are close enough for their respective threads to strike one another. As will be appreciated from the foregoing description, the centering pin may extend from the female recess of an electrode section for the purpose of being joined with a nipple of a second electrode section or the nipple of an electrode connecting pin, which nipple in either event is provided with a complementary recess to receive the connecting pin. Also, as explained, the centering pin, if of sufficient length, could extend from the nipple of either an electrode section or a connecting pin for the purpose of entering a complementary hole in the bottom of the female recess of the same. It must be appreciated that movement of massive electrode sections can cause great impact forces on the somewhat fragile threads, even if the amplitude of that movement is small. This invention prevents such thread impacts by means of the consumable sacrificial centering pin positioned where any debris it generates from impact with its mating hole will not interfere with the peripheral threads.

Referring now to the drawing, the preferred configuration is shown in FIG. 1. A hole 10, coaxial with the thread axis, is drilled into one end of a connecting pin 12 which is threaded into the female recess 14 of an electrode section 16. A centering pin 18, whose length preferably extends beyond the face 20 of a second electrode section 22, is snugly inserted into a hole 24 which is provided in the bottom 26 of the female recess 28 of the second electrode section 22. The hole 10 with a free fit with centering pin 18 is deep enough to admit the centering pin 18.

As indicated, centering pin 18 in the hole 24 in the base of the furnace electrode section recess 28, protrudes past the end face 20 of the electrode. As the electrode section 16 and connecting pin 12 is lowered by the crane, the hole 10 in the connecting pin 12 encloses the centering pin 18. This inhibits the tendency for the electrode section 16 and connecting pin 12 to swing like a pendulum. Since the centering pin 18 holds the two elements in axial alignment they may penetrate closer to the point of thread meshing without making physical contact.

While centering pins shorter than the depth of a female recess may be employed, it has been found preferable that the pin length protrudes past the socket end face.

Figure 2:
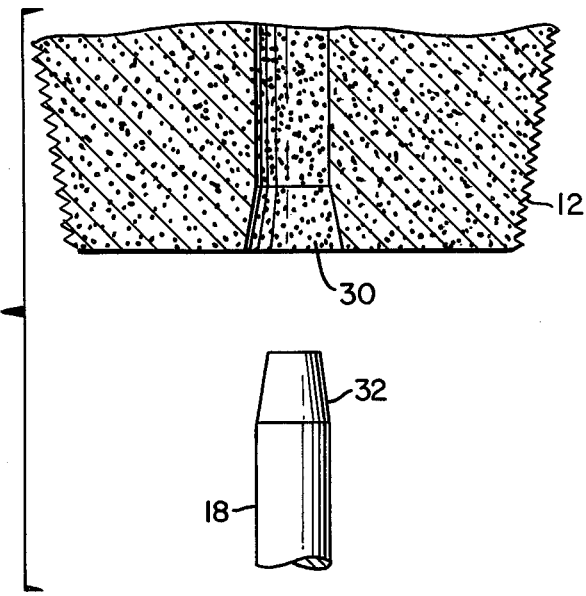
FIG. 2 is an exploded side view section of an electrode connecting pin and a complementary consumable centering pin.

In addition, as shown in FIG. 2, the provision of a tapered hole 30 facilitates the entry of the centering pin 18 which may also be provided with a tapered end 32.

For the purposes of this invention, lift plugs or lift caps are considered to be identical to a male or female machined electrode section.

In the described invention, provision for the alignment centering pin is made when the concerned electrode column member is machined. The pin may be held in its hole by gravity or by any attaching method such as friction, cements, or screw threads.

By way of summary, the centering pin may be in either the to be added electrode section or the electrode section in place in the furnace and may be installed at the time the electrode column is being assembled or at the time of manufacture of the electrode section. The centering pin is less exposed to damage if it is in the electrode section having a female recess, but it may be in a male electrode section having a male nipple with no loss of function. The exposed centering pin member need not be as long as the mating element length. The shorter length may be advantageous in high-taper, coarse-threaded joints where visual alignment of the initial penetration may be sufficient to prevent accidental contact. The aforesaid is also true when the centering pin is positioned in a connecting pin rather than in an electrode section.

The kind of material used in the fabrication of the centering pin is not critical, so long as the material does not cause problems in the furnace during operation, inasmuch as the device is left in place as the electrode column is consumed in an electric arc furnace. In addition, the centering pin material must be strong enough to withstand the structural application requirements. With consideration to the foregoing, metal, carbon, or graphite are all satisfactory materials. However, if any residue of the centering pin is undesirable, for whatever reason, it may be made of many other totally consumable materials such as plastic or wood.

The method and device of the invention has been tested under actual use conditions and has been found to be completely successful for the accomplishment of the above-stated objects of the present invention.

The operation and use of the invention hereinabove described will be evident to those skilled in the art to which it relates from a consideration of the foregoing and it will thus be seen that there is provided a method and device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing.

It is to be understood that various changes in shape, size, and arrangements of the elements used in the practice of this invention as claimed may be resorted to in actual practice, if desired.

We claim:

1. A method for joining two electrode sections to form or extend a carbon or graphite electrode column wherein each of said electrode sections is provided with a mating male nipple at one end and a female recess at the end opposite said nipple, which method comprises providing one of said electrode sections with a consumable centering pin axially disposed along the center line of said electrode section and providing the second electrode section which is to be joined to the first electrode section in a male to female engagement with a hole axially disposed along the center line of said second electrode section with the overall length of the centering pin being equal to or less than the depth of the hole and which hole is adapted to engage said centering pin when said electrode sections which are to be threaded together are brought together but prior to actual engagement of said threaded portions of said electrode sections.

2. The method of claim 1, wherein said centering pin is disposed in the female recess of one of the electrode sections to be threaded together and said hole which is adapted to engage said centering pin is in the male nipple of the second electrode section which is to be threaded together with said first electrode section.

3. The method of claim 2, wherein the end of said centering pin extends beyond the lateral end face of the electrode section in which it is disposed.

4. The method of claim 1, 2, or 3, wherein the end of said centering pin and the opening of said hole have oppositely tapered end portions.

5. The method of claim 1, 2, or 3 wherein the end of said centering pin has a tapered or rounded end portion.

6. The method of claim 1, 2, or 3 wherein said hole has a tapered end portion to receive said pin.

7. A method for joining two electrode sections together to form or extend a carbon or graphite electrode column wherein each of said electrode sections is provided with a female recess at each of the opposite ends of each of said electrode sections and said electrode sections are physically joined together by a double male ended carbon or graphite connecting pin and one end of which is threaded into a female recess of a first electrode section to be joined to the second electrode section, each of said female recesses and said double male ended connecting pin being provided with tapered threads and which comprises providing the female recess of the second electrode section with a consumable centering pin axially disposed along the center line of said electrode section and providing the end of the connecting pin that is to be threaded into said female recess with a hole axially disposed along the center line of said connecting pin with the overall length of the centering pin being equal to or less than the depth of the hole and which hole is adapted to engage said centering pin when said connecting pin which is to be threaded together when the second electrode section are brought together but prior to actual engagement of said threaded portions of said connecting pin and said second electrode section.

8. The method of claim 7, wherein the end of said centering pin extends beyond the lateral face of the electrode section in which it is disposed.

9. The method of claim 7 or 8, wherein the end of said centering pin and the opening of said hole have oppositely tapered end portions.

10. The method of claim 7 or 8, wherein the end of said centering pin has a tapered or rounded end portion.

11. The method of claim 7 or 8, wherein said hole has a tapered end portion to receive said pin.

12. In an electrode column for use in an electric arc furnace which comprises two carbon or graphite electrode sections and each of which electrode sections is provided at opposite ends with a male nipple and a female recess and which are joined together with tapered threads on the male nipple and in the female recess, the improvement of which comprises a consumable centering pin axially disposed along the center axis of one electrode section and which is engaged in a hole axially disposed along the central axis of the other electrode section.

13. In an electrode column for use in an electric arc furnace which comprises two carbon or graphite electrode sections each having a taper threaded female recess at each of their opposite ends and which are joined together by a carbon or graphite double-ended taper threaded male nipple connecting pin, the improvement of which comprises a consumable centering pin axially disposed along the center axis of the end of the electrode section into which the connecting pin is threaded last and which is engaged in a hole axially disposed along the central axis of the connecting pin, said hole having the open end at the face of the connecting pin opposite the end of the connecting pin first threaded into an electrode section.

* * * * *